US008092003B2

(12) United States Patent
Sloan

(10) Patent No.: US 8,092,003 B2
(45) Date of Patent: Jan. 10, 2012

(54) DIGITAL PRINTING SYSTEM

(76) Inventor: Donald D. Sloan, Platte City, MO (US)

( * ) Notice: Subject to any disclaimer, the term of this patent is extended or adjusted under 35 U.S.C. 154(b) by 403 days.

(21) Appl. No.: 11/557,750

(22) Filed: Nov. 8, 2006

(65) Prior Publication Data

US 2008/0122880 A1 May 29, 2008

(51) Int. Cl.
*G01D 11/00* (2006.01)

(52) U.S. Cl. ............................. 347/100; 347/96; 347/95

(58) Field of Classification Search .................. 347/100, 347/95, 96, 101, 102, 105; 106/31.6, 31.13, 106/31.27; 523/160
See application file for complete search history.

(56) References Cited

U.S. PATENT DOCUMENTS 5,260,101 A 11/1993 Larson et al.
5,767,188 A * 6/1998 Kamikuri et al. ............. 524/507
6,084,619 A * 7/2000 Takemoto et al. .............. 347/96
6,383,572 B1 5/2002 De Graaf et al.
2003/0031843 A1 2/2003 Wu et al.
2003/0211248 A1 11/2003 Ko et al.
2004/0189764 A1 9/2004 Aono et al.
2005/0014005 A1* 1/2005 Kramer et al. .................... 347/1
2005/0174407 A1 8/2005 Johnson et al.
2006/0222789 A1 10/2006 Dontula et al.
2007/0077520 A1* 4/2007 Maemoto ................... 430/270.1

FOREIGN PATENT DOCUMENTS

WO WO 03/049515 A1 * 6/2003

* cited by examiner

*Primary Examiner* — Manish S Shah
(74) *Attorney, Agent, or Firm* — Hovey Williams LLP

(57) ABSTRACT

Systems and methods for digitally printing images onto substrates are provided using digital inks and catalysts which initiate and/or accelerate curing of the inks on the substrates. The ink and catalyst are kept separate from each other while inside the heads of an inkjet printer and combine only after being discharged therefrom. The system produces high-quality, high-resolution images on substrates that may not normally receptive to low-viscosity digital inks.

25 Claims, 2 Drawing Sheets

DIGITAL PRINTING SYSTEM

BACKGROUND OF THE INVENTION

1. Field of the Invention

The present invention is generally directed toward systems and methods for digitally printing images onto substrates. More specifically, a digital ink and a catalyst are supplied to an inkjet head, the ink and catalyst being kept separate inside the head. The ink and catalyst are combined after being jetted from the inkjet head.

2. Description of the Prior Art

Digital printing of images onto a medium or substrate presents a number of advantages over conventional printing techniques such as screen printing. Digital printing allows for selective depositing of fine droplets of ink onto the medium in order to form a highly detailed image. Further, digital printing allows for on-demand printing of images without the costly and complex setup that is associated with screen printing.

Conventional inks for use with inkjet printers generally share certain common characteristics. For examples inkjet inks, also called digital inks, generally present low viscosities which facilitate flow of the ink through the very small nozzles of inkjet heads. The low viscosities of digital inks are generally made possible by the presence of a liquid dispersant or solvent in which the solids phase of the ink is dispersed. Once jetted the dispersant or solvent evaporates thereby causing the ink to set or cure on the substrate to which it is applied. Organic solvents, while fast evaporating, are increasingly disfavored due to environmental and workplace regulations limiting release and exposure to such organic vapors. Water-based inks are a more popular alternative to organic solvents, however, water is much less volatile leading to increased drying or curing times.

In some applications, an increased drying time is little more than a nuisance. However, in other applications, increased drying time leads to degradation of the quality of an image as the low viscosity ink can bleed or run on the substrate while the water evaporates. Accelerators can be added to the digital inks to help speed up the curing time, however, such combined systems can be unstable as the ink can prematurely cure or gel inside the inkjet head leading to plugged inkjet nozzles which degrade the quality of images printed using the inkjet head.

The problems with digital inks are particularly pronounced when printing to unconventional substrates such as textiles, glass, synthetic resin materials, and the like. Therefore, a need exists for a printing system for use in connection with a wide variety of substrates that presents the benefits of digital printing without the drawbacks of slow curing times and image degradation that are traditionally associated therewith.

SUMMARY OF THE INVENTION

The present invention overcomes the above problems by providing systems and methods for printing high quality, durable images onto substrates using an inkjet printer. In one embodiment, the invention is directed toward a method of digitally printing an image onto a substrate comprising the steps of: supplying at least one digital ink and at least one catalyst to an inkjet head, and maintaining the ink and catalyst separate from each other inside the head; discharging an amount of ink from the inkjet head toward the substrate; and discharging a quantity of catalyst from the inkjet head toward the substrate. The ink and catalyst combine with each other subsequent to being discharged from the inkjet head for curing of the ink on the substrate.

In another embodiment, the present invention is directed toward a system for digitally printing an image onto a substrate comprising an inkjet head presenting at least one ink nozzle and at least one catalyst nozzle, a digital ink supplied to the at least one ink nozzle, and a catalyst supplied to the at least one catalyst nozzle. The ink and catalyst are kept separate from each other while inside the inkjet head.

DETAILED DESCRIPTION OF THE PREFERRED EMBODIMENT

The present invention is generally directed toward systems and methods for digitally printing an image onto a substrate, especially substrates that are not traditionally known to be receptive to digital inks. Digital inks, i.e., inks that are printed using a digital printing device such as an inkjet printer, must possess certain characteristics that will enable them to be printed through the very small nozzles of an inkjet head. For example, digital inks generally present lower viscosities than inks used with other types of printing processes to facilitate reliable flow through the inkjet head. Digital inks should also be relatively stable inside the inkjet head so as not to prematurely cure thereby clogging the nozzles through which the ink is dispensed.

Most traditional digital inks require solvent evaporation in order to initiate curing of the ink once it has been applied to a substrate. Other digital inks include a curative agent such as a photoinitiator which initiates cross-linking of resins within the ink upon exposure to a source of UV radiation or heat. For most of these inks, curing does not occur rapidly enough to prevent the ink from bleeding into or migrating across portions of the substrate other than the portion to which it was applied. Various self-initiating curative agents are available which would effect a more rapid cure of the ink. However, such curative agents would cause the ink to prematurely gel inside the inkjet head thereby clogging the ink nozzles and leading to undesirable equipment downtime.

The present invention provides systems and methods that allows digital inks to be applied to substrates which heretofore may have been unsuitable for use with conventional inkjet inks. Using an inkjet head that is capable of applying a plurality of different inks, a digital ink and a catalyst for initiating curing of the ink may be separately discharged from the inkjet head and combined prior or subsequent to contacting the substrate. Thus, the present invention allows for the use of curing agents and catalysts capable of initiating a more rapid cure of the digital inks without risking premature curing within the inkjet head.

Figure 1:
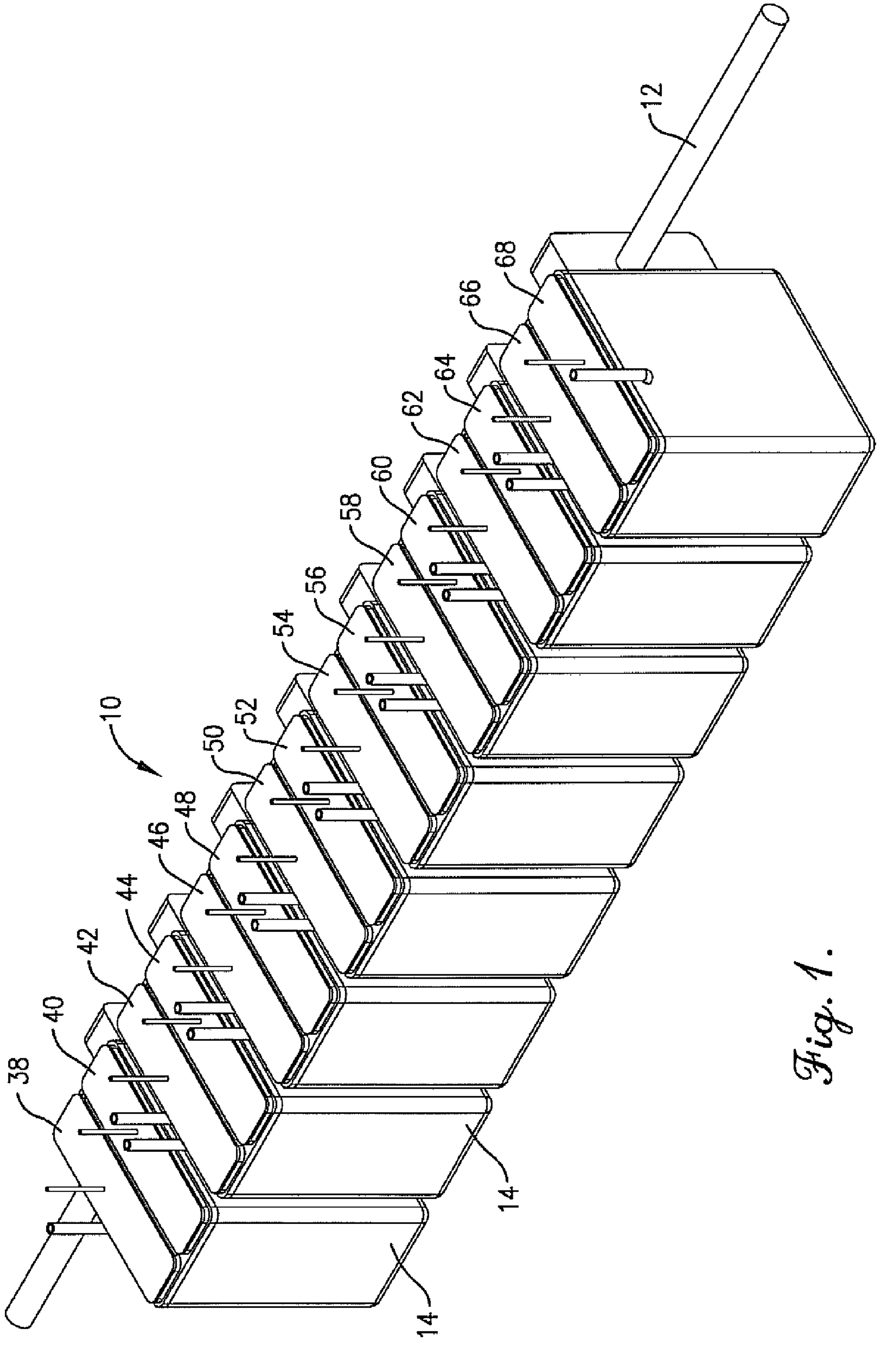
FIG. 1 is a perspective view of an array of inkjet heads that can be used in conjunction with the present invention.

Turning now to FIG. 1, an array of inkjet heads 10 is shown attached to a rod bearing 12 as may be the case inside an inkjet printer. Of course, any other similar "track" structure suitable to support array 10 may be employed in place of bearing 12.

Array 10 comprises a plurality of inkjet heads 14, each of which includes at least one digital ink and at least one catalyst therein. As shown, array 10 includes eight separate heads 14. However, it is understood that array 10 could include fewer or more heads depending upon the particular printer or printing application being performed. Thus, the present invention may be used with as few as one inkjet head up to 16, 24, or more heads as necessary or desired.

Figure 2:
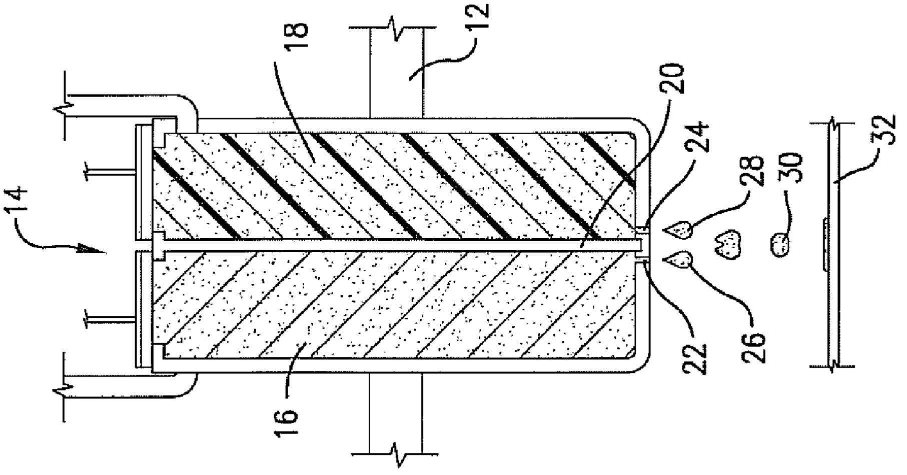
FIG. 2 is a cross-sectional view of a single inkjet head showing an ink/catalyst dispersal pattern wherein the ink and catalyst combine before contacting the substrate.

FIG. 2 depicts an exemplary inkjet head 14 that comprises an ink chamber 16 and a catalyst chamber 18 that are separated by a partition 20. Head 14 may contain a plurality of separate chambers therein, however, for ease of illustration head 14 as shown contains only two separate chambers. It is within the scope of the present invention to use an inkjet head that comprises two, four, six, eight, or more individual chambers. Head 14 presents at least one ink nozzle 22 and at least one catalyst nozzle 24 in communication with respective chambers 16, 18.

It is preferable that head 14 present a plurality of nozzles 22 and 24 that are axially aligned into respective columns of nozzles. While not as preferred as the configurations described above, array 10 can comprise a plurality of heads which are capable of only dispensing one type of material. In such an arrangement, heads should be spaced together as closely as possible so that the ink and catalysts nozzles may be in close proximity to each other.

Inkjet head 14 can operate according to any known inkjet technology, however, it is preferred that head 14 be a high-resolution piezoelectric printhead. Exemplary printheads include the SPECTRA SL-128, SPECTRANOVA PH 256, and EPSON Series 10000 printheads.

Nozzles 22 and 24 can be configured to produce different droplet or spray patterns. In FIG. 2, nozzles 22 and 24 are configured to provide converging ink and catalyst droplets 26, 28 which combine to form a merged droplet 30 prior to contacting substrate 32. By combining ink and catalysts droplets 26, 28 prior to contact with substrate 32, curing of the digital ink can occur as quickly as possible.

Figure 3:
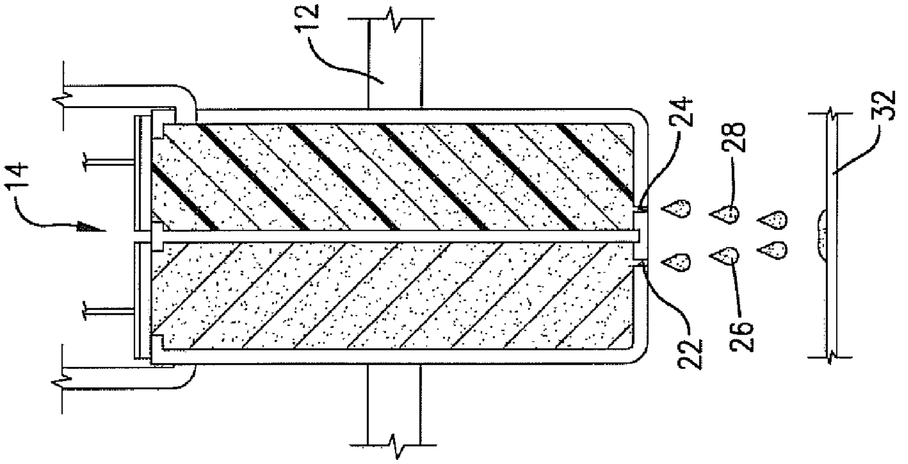
FIG. 3 is a cross-sectional view of a single inkjet head showing an ink/catalyst dispersal pattern wherein the ink and catalyst combine subsequent to the ink contacting the substrate.

FIG. 3 depicts another nozzle configuration. Nozzles 22 and 24 still provide converging ink and catalysts droplets 26, 28, however, these droplets do not combine until at least the ink droplet has contacted substrate 32. Thus, mixing of the ink and catalyst occurs on substrate 32 as opposed to above it as shown and described in FIG. 2.

Figure 4:
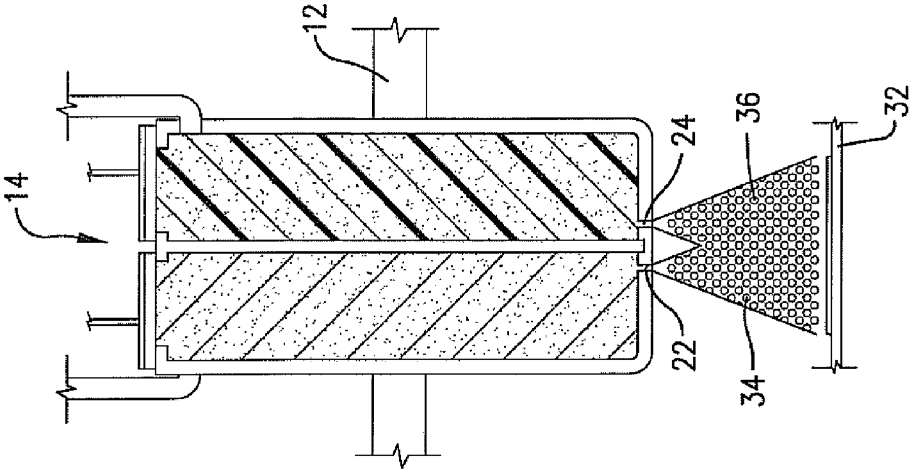
FIG. 4 is a cross-sectional view of a single inkjet head showing an ink/catalyst dispersal pattern wherein the ink and catalyst are both sprayed onto the substrate.

FIG. 4 shows yet another type of nozzle configuration wherein nozzles 22 and 24 produce overlapping spray patterns 34, 36 of ink and catalyst, respectively. This dispersal pattern is similar in function to that shown in FIG. 2 inasmuch as the ink and catalyst as combining prior to contact with substrate 32. The spray configuration of FIG. 4 may be modified so that ink 34 may be deposited onto substrate 32 prior to application of catalyst 36. Controlled firing of nozzles 22 and 24 as head 14 traverses bearing 12 would facilitate such an arrangement.

The present invention can accommodate the use of a wide variety of digital inks. Generally, the digital ink is water-based and comprises at least one cross-linkable resin having at least one reactive site. Preferably, the resin is an acrylic resin that includes at least one free hydroxyl group or at least one free carboxyl group capable of undergoing free-radical polymerization. Exemplary acrylic resins include water-dispersible acrylic resins such as RHOPLEX TR-38 available from Rohm & Haas. These resins generally present a slightly basic pH (between about 7.5-9) and glass transition temperatures well below room temperature (between about −40-0° C.).

The digital inks also include a pigment dispersed therein. Preferred pigments include HOSTAJET pigments available from Clariant Corp., however, any pigments suitable for ink-jet applications (i.e., those having particle sizes below 1 micron, a narrow particle size distribution, low viscosities, and good stability) may be used. The resin and pigment are dispersed in an aqueous medium. The amount of water present in the ink formulation may be varied in order to provide an ink viscosity that is suitable for a particular application.

The ink formulations may also include a number of optional additives such as surfactants, binders, biocides, wetting agents, thickeners, rheology modifiers, antioxidants, and stabilizers. Exemplary thickeners and rheology modifiers include glycerine, fatty acid modified polyesters available under the name EFKA from EFKA Additives B.V., the Netherlands, ACRYSOL products available from Rohm and Haas, and TROYSOL products available from Troy Corporation, Florham Park, N.J. Exemplary biocides include aqueous dipropylene glycol solutions of 1,2-benzisotliiazolin-3-one available under the name PROXEL from Avecia, Ltd., Manchester, UK. Exemplary surfactants include water soluble, anionic phosphate surfactants such as those available under the name ZONYL from DuPont Performance Chemicals. Triethanolanine is an exemplary binder for use with the present invention.

Depending upon the application, inks, especially those containing white pigment, may also comprise an optical brightener or whitening agent such as 2,2'-(2,5-thiophenediyl)bis(5-tert-butylbeizoxazole) available under the name BENETEX from Mayzo, INC., Norcross Ga. The optical brightener helps compensate for yellowing attributable to other polymers present in the ink formulation or present in the substrate to which the ink will be applied. Also, optical brighteners create luster and brilliance within the ink by absorbing UV light, modifying the wavelength of the light, and then emitting the light in a florescent fashion. Preferably, the optical brightener is water emulsifiable and chemically stable.

Because the inks are designed to be jetted through an inkjet head, the viscosity of the ink is an important property. As noted above, the amount of water present in the ink is the primary means of viscosity control. Generally, inks made in accordance with the present invention present a viscosity at 25° C. between about 1 to about 30 cp, more preferably between about 3 to about 15 cp, and most preferably between about 3 to about 7 cp.

It is preferred that the digital inks are free of organic solvent compounds, particularly volatile organic compounds (VOCs). As used herein the phrase "free of organic solvent compounds" it understood to mean that the ink formulations comprise no more than about 0.01% by weight of an organic solvent, and preferably no more than about 0.001% by weight of an organic solvent.

The following table presents approximate broad and preferred ranges for the various ink components used to formulate inks according to the present invention. All percentages are expressed based on the weight of the entire ink formulation unless otherwise indicated.

| Component | Broad Range | Preferred Range |
|---|---|---|
| Cross-linkable Resin | 5-45% | 15-30% |
| Pigment | 3-40% | 5-35% |
| Water | 20-75% | 35-65% |
| Glycerine | 0-10% | 1-7% |

-continued

| Component | Broad Range | Preferred Range |
|---|---|---|
| Triethanolamine | 0-5% | 0.01-1% |
| Biocide Surfactant | 0-3% | 0.01-0.5% |
| Rheology Modifier | 0-5% | 0.01-2.5% |
| Optical Brightener | 0-8% | 0.1-5% |
| Viscosity (at 25° C.) | 1-30 cp | 3-15 cp |

A catalyst is used in connection with the present invention to initiate and/or accelerate curing of the ink compositions. Generally, the catalyst initiates or accelerates the formation of free radicals in the resin portion of the ink which causes tie ink to cross-link thereby producing a more durable printed image. Selection of a catalyst depends at least in part on compatibility with the ink system and the conditions under which curing is desirable.

There are two basic types of catalysts that can be used. One type of catalyst initiates curing of the ink under ambient conditions without further energy input. This type of catalyst is also referred to as a self-initiating catalyst. Cross-linking of the ink resin begins upon contact with the catalyst. Exemplary self-initiating catalysts include isocyanate prepolymers, zinc oxide, magnesium oxide, zinc ammonium complex, zirconium ammonium complex, zinc acetate, and zirconium acetate. A particularly preferred catalyst is an aqueous alkaline solution of stabilized ammonium zirconium carbonate, containing anionic hydroxylated zirconium polymers available from MEL Chemicals, Flemington, N.J., under the name BACOTE 20. BACOTE 20 presents a viscosity of about 5 cp, a pH of 9.2-9.8, a specific gravity of 1.36, and is stable for extended periods of time at elevated temperature. It is important that these catalysts be kept separate from the inks until each is discharged from the printer head, as curing begins immediately upon contact.

Another type of catalyst is one that requires additional energy input in order to initiate and/or speed the curing process. Generally, the additional energy input is provided as thermal or heat energy thereby making this ink and catalyst system a thermally reactive system. Exemplary catalysts of this type include urea formaldehyde resins, melamine formaldehyde resins, aziridine resins, and carbodiimide resins. The thermal energy may be supplied to the ink/catalyst system through a low-temperature bake cycle in which the substrate having the ink printed thereon is passed through an oven or a tunnel dryer. The bake cycle is generally carried out at a temperature between about 185-350° F. (85-177° C.) and may last for a period of seconds to minutes, preferably between about 3-8 minutes. Also, at least some of the thermal energy may be supplied to the ink and catalyst individually prior to jetting through the use of a heated inkjet head.

The ratio of ink to catalyst can be varied depending upon the curing properties desired. Particularly, the amount of catalyst delivered through the inkjet head is based upon the solids content of the ink. The catalyst is generally provided to the inkjet head as an aqueous dispersion or solution that can be diluted as needed. The catalyst is present in this dispersion or solution at a level of about 0.1-50% by weight, more preferably between about 0.25-10% by weight, and most preferably between about 0.25-6% by weight.

An accelerator may be used in addition to the catalyst for accelerating curing of the ink on the substrate. Preferably, the accelerator is an acid catalyst such as p-toluene sulfonic acid (PTSA). The accelerator may be present in the system at a level of about 0.01-5% based on the combined weight of the ink and catalyst system, more preferably between about 0.25-2%, and most preferably between about 0.5-1%. Preferably, the accelerator is initiallypartofthe catalyst formulation that is discharged from the inkjet head. However, it is within the scope of the present invention for the ink formulation to include the accelerator. Care should be taken when selecting an accelerator to be added to the ink formulation so that the ink does not gel inside the inkjet head. The present method of digitally printing can be used in connection with many different types of substrates, particularly substrates that may not be receptive to conventional digital inks. Preferred substrates for use with the present invention include natural and synthetic textiles (including but not limited to fabrics made from cotton, flax, polyester, nylon, rayon, silk, and wool, and paper products), glass, ceramic tile, metal sheets, sheets of synthetic resin materials (including but not limited to polystyrene, polyethylene, polypropylene, and PET), and combinations thereof.

The inks and catalysts described above may be used in a number of configurations within an inkjet printer. Typically, the inks and catalysts are arranged in an alternating columnar pattern of nozzles. For example, a first column of nozzles may discharge a magenta ink, the next adjacent column of nozzles may discharge catalyst, followed by a column for cyan, followed by a column for catalyst, etc. An exemplary arrangement of inks and catalyst is shown in FIG. 1. Chamber 38 may be loaded with magenta ink, adjacent chamber 40 may contain catalyst. Chamber 42 may contain cyan ink and chamber 44 may contain catalyst. Chamber 46 may contain yellow ink and chamber 48 may contain catalyst. Chamber 50 may contain black ink and chamber 52 may contain catalyst. Chamber 54 may contain white ink and chamber 56 may contain catalyst. Chambers 58, 62, and 66 may be loaded with other colors of ink and chambers 60, 64, and 68 may contain catalyst. Of course, the various colors may be arranged in any desired format, however, it is preferred that a column of catalyst nozzles be located between adjacent columns of ink nozzles.

The low ink viscosities enable the present invention to utilize inkjet heads calibrated to deliver droplets or sprays having a volume of between about 3-12 picoliters and nozzle diameters of between about 20-75 microns. As noted above, the individual nozzles are arranged in linear columns and can present a distance between nozzles in the column (and between nozzles of adjacent columns) of between about 0.010 to about 0.020 inches. The resolution of the inkjet heads is preferably at least about 300 dpi, at least about 400 dpi, and most preferably at least about 600 dpi. The present invention is capable of digitally printing near-photographic and photographic quality images, a feat which would not have been possible on many substrates using conventional digital inks.

In operation, heads 14 can be programmed to fire (i.e., eject ink and/or catalyst) while traveling upon bearing rod 14 in a unidirectional manner only (i.e., right-to-left or left-to-right only) or in a bidirectional manner (i.e., both right-to-left and left-to-right). Generally, firing heads 14 in a unidirectional manner leads to a greater resolution, but longer print times. In each firing situation, both ink and catalyst may be fired simultaneously from head 14 in one of the patterns shown in FIGS. 2-4 and described above, or head 14 may fire ink onto the substrate followed by a subsequent firing of catalyst over the top of the ink laid down on the substrate. However, it is preferred to fire the heads simultaneously so as to provide immediate contact between ink and catalyst thereby initiating a faster cure.

If the catalyst employed is one which is self-initiating, no further steps need to be taken. However, if the catalyst requires some additional energy input in order to initiate or speed cross-linking of the resin contained in the ink, the substrate having ink and catalyst applied thereto may be sent to a drying apparatus such as an oven or tunnel dryer.

Upon curing, the inks exhibit excellent durability. When used on textile substrates, the cured inks exhibit superior washability, allowing the textile to be washed at least about 25 times, more preferably at least about 50 times, without exhibiting any color fading that is perceptible to the naked eye (i.e., when compared to an unwashed article). Such characteristics allow the present inks to be used to print patterns on fabrics which can be used to make clothing, furniture upholstery, wall paper, or anything made from a decorative fabric. Also, high-detail, high-resolution images may be printed onto fabrics which heretofore has not possible, such as high-resolution digital images (i.e., greater than one megapixels, more preferably between 1.5-8 megapixels).

When applied to a hard substrate such as ceramic tile or glass, the cured ink presents increased hardness and excellent chip resistance. Again, high-detail, high-resolution images may be printed onto such hard substrates which are not generally receptive to conventional digital inks.

EXAMPLES

The following examples set forth preferred ink formulations suitable for use with the present invention. It is to be understood, however, that these examples are provided by way of illustration and nothing therein should be taken as a limitation upon the overall scope of the invention.

Example 1

This example is directed toward a magenta water-based ink formulation.

| Component | Amount (% by weight) | Component Description |
|---|---|---|
| RHOPLEX TR 38[1] | 20 | Aqueous acrylic emulsion |
| Deionized water | 57.35 | — |
| Glycerine | 5 | — |
| HOSTAJET MG EST[2] | 16 | Pigment |
| Triethanolamine | 0.5 | — |
| PROXEL GXL[3] | 0.15 | Biocide (Aqueous dipropylene glycol solution of 1,2-benzisothiazolin-3-one) |
| ZONYL FSE[4] | 0.5 | Surfactant (water-soluble, anionic phosphate fluorosurfactant) |
| TROYSOL LAC[5] | 0.5 | Wetting additive |

[1]Available from Rohm & Haas
[2]Available from Clariant Corp.
[3]Available from Avecia, Ltd, Manchester, UK
[4]Available from DuPont Performance Chemicals
[5]Available from Troy Corporation, Florham Park, New Jersey

Example 2

This example is directed toward a white water-based ink formulation.

| Component | Amount (% by weight) | Component Description |
|---|---|---|
| RHOPLEX TR 38[1] | 20 | Aqueous acrylic emulsion |
| Deionized water | 43.75 | — |

-continued

| Component | Amount (% by weight) | Component Description |
|---|---|---|
| Glycerine | 3 | — |
| D-2010W[2] | 29 | White Pigment |
| Triethanolamine | 0.5 | — |
| PROXEL GXL[3] | 0.15 | Biocide (Aqueous dipropylene glycol solution of 1,2-benzisothiazolin-3-one) |
| ZONYL FSE[4] | 0.5 | Surfactant (water-soluble, anionic phosphate fluorosurfactant) |
| TROYSOL LAC[5] | 0.5 | Wetting additive |
| BENETEX OB-EP[6] | 2.5 | Fluorescent whitening agent |
| ACRYSOL RM 825[1] | 0.1 | Rheology modifier |

[1]Available from Rohm & Haas
[2]Available from RJA Dispersions, Maplewood, MN
[3]Available from Avecia, Ltd, Manchester, UK
[4]Available from DuPont Performance Chemicals
[5]Available from Troy Corporation, Florham Park, New Jersey
[6]Available from Mayzo, Inc., Norcross, Georgia

Example 3

This example is directed toward a white water-based ink formulation.

| Component | Amount (% by weight) | Component Description |
|---|---|---|
| RHOPLEX TR 38[1] | 20 | Aqueous acrylic emulsion |
| Deionized water | 43.75 | — |
| Glycerine | 3 | — |
| D-2010W[2] | 31.5 | White Pigment |
| Triethanolamine | 0.5 | — |
| PROXEL GXL[3] | 0.15 | Biocide (Aqueous dipropylene glycol solution of 1,2-benzisothiazolin-3-one) |
| ZONYL FSE[4] | 0.5 | Surfactant (water-soluble, anionic phosphate fluorosurfactant) |
| TROYSOL LAC[5] | 0.5 | Wetting additive |
| ACRYSOL RM 1020[1] | 0.1 | Rheology modifier |

[1]Available from Rohm & Haas
[2]Available from RJA Dispersions, Maplewood, MN
[3]Available from Avecia, Ltd, Manchester, UK
[4]Available from DuPont Performance Chemicals
[5]Available from Troy Corporation, Florham Park, New Jersey

Example 4

This example is directed toward a white water-based ink formulation.

| Component | Amount (% by weight) | Component Description |
|---|---|---|
| RHOPLEX TR 38[1] | 20 | Aqueous acrylic emulsion |
| Deionized water | 41.45 | — |
| Glycerine | 4 | — |
| D-2010W[2] | 33 | White Pigment |
| Triethanolamine | 0.5 | — |
| PROXEL GXL[3] | 0.15 | Biocide (Aqueous dipropylene glycol solution of 1,2-benzisothiazolin-3-one) |
| ZONYL FSE[4] | 0.5 | Surfactant (water-soluble, anionic phosphate fluorosurfactant) |

-continued

| Component | Amount (% by weight) | Component Description |
|---|---|---|
| TROYSOL LAC[5] | 0.5 | Wetting additive |
| ACRYSOL G-111[1] | 0.4 | Rheology modifier |

[1]Available from Rohm & Haas

[2]Available from RJA Dispersions, Maplewood, MN

[3]Available from Avecia, Ltd, Manchester, UK

[4]Available from DuPont Performance Chemicals

[5]Available from Troy Corporation, Florham Park, New Jersey

Example 5

This example is directed toward a yellow water-based ink formulation.

| Component | Amount (% by weight) | Component Description |
|---|---|---|
| RHOPLEX TR 38[1] | 20 | Aqueous acrylic emulsion |
| Deionized water | 58.35 | — |
| Glycerine | 5 | — |
| HOSTAJET 4G[2] | 15 | Pigment |
| Triethanolamine | 0.5 | — |
| PROXEL GXL[3] | 0.15 | Biocide (Aqueous dipropylene glycol solution of 1,2-benzisothiazolin-3-one) |
| ZONYL FSE[4] | 0.5 | Surfactant (water-soluble, anionic phosphate fluorosurfactant) |
| TROYSOL LAC[5] | 0.5 | Wetting additive |

[1]Available from Rohm & Haas
[2]Available from Clariant Corp.
[3]Available from Avecia, Ltd, Manchester, UK
[4]Available from DuPont Performance Chemicals
[5]Available from Troy Corporation, Florham Park, New Jersey

Example 6

This example is directed toward a light magenta water-based ink formulation.

| Component | Amount (% by weight) | Component Description |
|---|---|---|
| RHOPLEX TR 38[1] | 30 | Aqueous acrylic emulsion |
| Deionized water | 54.35 | — |
| Glycerine | 5 | — |
| HOSTAJET MG EST[2] | 9 | Pigment |
| Triethanolamine | 0.5 | — |
| PROXEL GXL[3] | 0.15 | Biocide (Aqueous dipropylene glycol solution of 1,2-benzisothiazolin-3-one) |
| ZONYL FSE[4] | 0.5 | Surfactant (water-soluble, anionic phosphate fluorosurfactant) |
| TROYSOL LAC[5] | 0.5 | Wetting additive |

[1]Available from Rohm & Haas
[2]Available from Clariant Corp.
[3]Available from Avecia, Ltd, Manchester, UK
[4]Available from DuPont Performance Chemicals
[5]Available from Troy Corporation, Florham Park, New Jersey

Example 7

This example is directed toward a light cyan water-based ink formulation.

| Component | Amount (% by weight) | Component Description |
|---|---|---|
| RHOPLEX TR 38[1] | 33 | Aqueous acrylic emulsion |
| Deionized water | 54.35 | — |
| Glycerine | 5 | — |
| HOSTAJET VP2778[2] | 6 | Pigment |
| Triethanolamine | 0.5 | — |
| PROXEL GXL[3] | 0.15 | Biocide (Aqueous dipropylene glycol solution of 1,2-benzisothiazolin-3-one) |
| ZONYL FSE[4] | 0.5 | Surfactant (water-soluble, anionic phosphate fluorosurfactant) |
| TROYSOL LAC[5] | 0.5 | Wetting additive |

[1]Available from Rohm & Haas
[2]Available from Clariant Corp.
[3]Available from Avecia, Ltd, Manchester, UK
[4]Available from DuPont Performance Chemicals
[5]Available from Troy Corporation, Florham Park, New Jersey

Example 8

This example is directed toward a dark cyan water-based ink formulation.

| Component | Amount (% by weight) | Component Description |
|---|---|---|
| RHOPLEX TR 38[1] | 22 | Aqueous acrylic emulsion |
| Deionized water | 59.35 | — |
| Glycerine | 5 | — |
| HOSTAJET VP2778[2] | 12 | Pigment |
| Triethanolamine | 0.5 | — |
| PROXEL GXL[3] | 0.15 | Biocide (Aqueous dipropylene glycol solution of 1,2-benzisothiazolin-3-one) |
| ZONYL FSE[4] | 0.5 | Surfactant (water-soluble, anionic phosphate fluorosurfactant) |
| TROYSOL LAC[5] | 0.5 | Wetting additive |

[1]Available from Rohm & Haas
[2]Available from Clariant Corp.
[3]Available from Avecia, Ltd, Manchester, UK
[4]Available from DuPont Performance Chemicals
[5]Available from Troy Corporation, Florham Park, New Jersey

Example 9

This example is directed toward a black water-based ink formulation.

| Component | Amount (% by weight) | Component Description |
|---|---|---|
| RHOPLEX TR 38[1] | 20 | Aqueous acrylic emulsion |
| Deionized water | 58.35 | — |
| Glycerine | 5 | — |
| HOSTAJET OP TK[2] | 15 | Pigment |
| Triethanolamine | 0.5 | — |
| PROXEL GXL[3] | 0.15 | Biocide (Aqueous dipropylene glycol solution of 1,2-benzisothiazolin-3-one) |

-continued

| Component | Amount (% by weight) | Component Description |
| --- | --- | --- |
| ZONYL FSE[4] | 0.5 | Surfactant (water-soluble, anionic phosphate fluorosurfactant) |
| TROYSOL LAC[5] | 0.5 | Wetting additive |

[1]Available from Rohm & Haas
[2]Available from Clariant Corp.
[3]Available from Avecia, Ltd, Manchester, UK
[4]Available from DuPont Performance Chemicals
[5]Available from Troy Corporation, Florham Park, New Jersey

Example 10

This example is directed toward a yellow water-based ink formulation.

| Component | Amount (% by weight) | Component Description |
| --- | --- | --- |
| RHOPLEX TR 38[1] | 20 | Aqueous acrylic emulsion |
| Deionized water | 50.35 | — |
| Glycerine | 4 | — |
| HOSTAJET 4G[2] | 24 | Pigment |
| Triethanolamine | 0.5 | — |
| PROXEL GXL[3] | 0.15 | Biocide (Aqueous dipropylene glycol solution of 1,2-benzisothiazolin-3-one) |
| ZONYL FSE[4] | 0.5 | Surfactant (water-soluble, anionic phosphate fluorosurfactant) |
| TROYSOL LAC[5] | 0.5 | Wetting additive |

[1]Available from Rohm & Haas
[2]Available from Clariant Corp.
[3]Available from Avecia, Ltd, Manchester, UK
[4]Available from DuPont Performance Chemicals
[5]Available from Troy Corporation, Florham Park, New Jersey

Example 11

This example describes a magenta water-based ink formulation.

| Component | Amount (% by weight) | Component Description |
| --- | --- | --- |
| RHOPLEX TR 38[1] | 30.83 | Aqueous acrylic emulsion |
| Deionized water | 42.81 | — |
| 1-methoxy-2-propanol[2] | 10.33 | Solvent (propylene glycol monomethyl ether) |
| HOSTAJET MG EST[3] | 15.49 | Pigment |
| PROXEL GXL[4] | 0.15 | Biocide (Aqueous dipropylene glycol solution of 1,2-benzisothiazolin-3-one) |
| EFKA 7564[5] | 0.39 | Additive (fatty acid modified polyester) |

[1]Available from Rohm & Haas
[2]Available from Lyondell Asia Pacific, Ltd., Hong Kong, under the name ARCOSOLV PM Solvent
[3]Available from Clariant Corp.
[4]Available from Avecia, Ltd, Manchester, UK
[5]Ciba Specialty Chemicals Corp., Tarrytown, NY

Example 12

This example describes a yellow water-based ink formulation.

| Component | Amount (% by weight) | Component Description |
| --- | --- | --- |
| RHOPLEX TR 38[1] | 30.84 | Aqueous acrylic emulsion |
| Deionized water | 37.64 | — |
| 1-methoxy-2-propanol[2] | 10.33 | Solvent (propylene glycol monomethyl ether) |
| HOSTAJET 4G[3] | 20.65 | Pigment |
| PROXEL GXL[4] | 0.15 | Biocide (Aqueous dipropylene glycol solution of 1,2-benzisothiazolin-3-one) |
| EFKA 7564[5] | 0.39 | Additive (fatty acid modified polyester) |

[1]Available from Rohm & Haas
[2]Available from Lyondell Asia Pacific, Ltd., Hong Kong, under the name ARCOSOLV PM Solvent
[3]Available from Clariant Corp.
[4]Available from Avecia, Ltd, Manchester, UK
[5]Ciba Specialty Chemicals Corp., Tarrytown, NY

Example 13

This example describes a cyan water-based ink formulation.

| Component | Amount (% by weight) | Component Description |
| --- | --- | --- |
| RHOPLEX TR 38[1] | 30.83 | Aqueous acrylic emulsion |
| Deionized water | 47.97 | — |
| 1-methoxy-2-propanol[2] | 10.33 | Solvent (propylene glycol monomethyl ether) |
| HOSTAJET VP 2778[3] | 10.33 | Pigment |
| PROXEL GXL[4] | 0.15 | Biocide (Aqueous dipropylene glycol solution of 1,2-benzisothiazolin-3-one) |
| EFKA 7564[5] | 0.39 | Additive (fatty acid modified polyester) |

[1]Available from Rohm & Haas
[2]Available from Lyondell Asia Pacific, Ltd., Hong Kong, under the name ARCOSOLV PM Solvent
[3]Available from Clariant Corp.
[4]Available from Avecia, Ltd, Manchester, UK
[5]Ciba Specialty Chemicals Corp., Tarrytown, NY

Example 14

This example describes a black water-based ink formulation.

| Component | Amount (% by weight) | Component Description |
| --- | --- | --- |
| RHOPLEX TR 38[1] | 32.19 | Aqueous acrylic emulsion |
| Deionized water | 41.45 | — |
| 1-methoxy-2-propanol[2] | 10.33 | Solvent (propylene glycol monomethyl ether) |
| HOSTAJET O-PT[3] | 15.49 | Pigment |
| PROXEL GXL[4] | 0.15 | Biocide (Aqueous dipropylene glycol solution of 1,2-benzisothiazolin-3-one) |

-continued

| Component | Amount (% by weight) | Component Description |
|---|---|---|
| EFKA 7564[5] | 0.39 | Additive (fatty acid modified polyester) |

[1]Available from Rohm & Haas
[2]Available from Lyondell Asia Pacific, Ltd., Hong Kong, under the name ARCOSOLV PM Solvent
[3]Available from Clariant Corp.
[4]Available from Avecia, Ltd, Manchester, UK
[5]Ciba Specialty Chemicals Corp., Tarrytown, NY

I claim:

1. A method of digitally printing an image onto a substrate comprising the steps of:

supplying at least one digital ink and at least one catalyst to an inkjet head, and maintaining said ink and catalyst separate from each other inside said head;

discharging an amount of said ink from said inkjet head toward said substrate; and discharging a quantity of catalyst from said inkjet head toward said substrate, said ink and said catalyst combining subsequent to being discharged from said inkjet head for curing of said ink on said substrate, said ink and said catalyst, when cured, forming an ink image on said substrate, said ink comprising between about 5-45% by weight of a cross-linkable acrylic resin, between about 3-40% by weight of a pigment, and between about 20-75% by weight water, said acrylic resin having a glass transition temperature of between about −40-0° C.

2. The method according to claim 1, said acrylic resin including at least one free hydroxyl group or at least one free carboxyl group.

3. The method according to claim 1, said catalyst being selected from the group consisting of isocyanate prepolymers, zinc oxide, magnesium oxide, zinc ammonium complexes, zirconium ammonium complexes, zinc acetate, zirconium acetate, urea formaldehyde resins, melamine formaldehyde resins, aziridine resins, carbodiimide resins, and combinations thereof.

4. The method according to claim 1, said inkjet head comprising at least one ink nozzle for dispensing said ink and at least one catalyst nozzle adjacent to said ink nozzle for dispensing said catalyst.

5. The method according to claim 4, including the steps of ejecting ink from said ink nozzle in the form of an ink spray and ejecting catalyst from said catalyst nozzle in the form of a catalyst spray.

6. The method according to claim 5, at least a portion of said ink spray and at least a portion of said catalyst spray combining prior to contacting said substrate.

7. The method according to claim 5, at least a portion of said ink spray and at least a portion of said catalyst spray combining subsequent to said ink spray contacting said substrate.

8. The method according to claim 4, including the steps of ejecting a droplet of ink from said ink nozzle and ejecting a droplet of catalyst from said catalyst nozzle.

9. The method according to claim 8, said ink droplet and said catalyst droplet combining prior to contacting said substrate.

10. The method according to claim 8, said ink droplet and said catalyst droplet combining subsequent to said ink droplet contacting said substrate.

11. The method according to claim 1, said substrate being selected from the group consisting of natural and synthetic textiles, glass, ceramic tile, sheets of synthetic resin material, metal sheets, and combinations thereof.

12. The method according to claim 1, including the step of curing said ink on said substrate.

13. The method according to claim 12, said curing step being initiated by the contact of said ink with said catalyst.

14. The method according to claim 12, said curing step being initiated by baking said substrate having said image printed thereon.

15. The method according to claim 1, said ink or said catalyst comprising an accelerator for accelerating curing of said ink on said substrate.

16. A system for digitally printing an image onto a substrate comprising:

an inkjet head presenting at least one ink nozzle and at least one catalyst nozzle;

at least one digital ink supplied to said at least one ink nozzle, said ink comprising between about 5-45% by weight of a cross-linkable acrylic resin, between about 3-40% by weight of a pigment, and between about 20-75% by weight water, said acrylic resin having a glass transition temperature of between about −40-0° C.; and a catalyst supplied to said at least one catalyst nozzle, said ink and said catalyst being kept separate from each other while inside said inkjet head.

17. The system according to claim 16, said at least one ink nozzle operable to generate a spray of ink therefrom.

18. The system according to claim 17, said at least one catalyst nozzle operable to generate a spray of catalyst therefrom.

19. The system according to claim 18, the spray pattern from said at least one ink nozzle overlapping said spray pattern from said at least one catalyst nozzle.

20. The system according to claim 16, said at least one ink nozzle and said at least one catalyst nozzle operable to generate converging droplets of ink and catalyst, respectively.

21. The system according to claim 20, said ink droplet and said catalyst droplet converging and contacting each other prior to said ink droplet contacting said substrate.

22. The system according to claim 20, said ink droplet and said catalyst droplet converging and contacting each other subsequent to said ink droplet contacting said substrate.

23. The system according to claim 16, said inkjet head presenting a plurality of columns comprising a plurality of nozzles, said columns being arranged in alternating columns of ink nozzles and catalyst nozzles.

24. The system according to claim 23, said inkjet head being supplied with at least two different colors of ink.

25. The system according to claim 16, said system comprising a plurality of inkjet heads arranged in series.

* * * * *